(12) United States Patent
Tanaka et al.

(10) Patent No.: US 12,135,440 B2
(45) Date of Patent: Nov. 5, 2024

(54) OPTICAL ELEMENT MANUFACTURING METHOD, OPTICAL ELEMENT, OPTICAL APPARATUS, AND IMAGE CAPTURING APPARATUS

(71) Applicant: CANON KABUSHIKI KAISHA, Tokyo (JP)

(72) Inventors: Hiroyuki Tanaka, Kanagawa (JP); Hideo Ukuda, Kanagawa (JP); Kouichi Yonetani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 504 days.

(21) Appl. No.: 17/360,990

(22) Filed: Jun. 28, 2021

(65) Prior Publication Data

US 2022/0003901 A1 Jan. 6, 2022

(30) Foreign Application Priority Data

Jul. 1, 2020 (JP) .................. 2020-114044

(51) Int. Cl.
*G02B 3/04* (2006.01)
*B32B 7/023* (2019.01)
*B32B 17/10* (2006.01)
*C03C 27/10* (2006.01)
*C08J 3/24* (2006.01)
(Continued)

(52) U.S. Cl.
CPC ............... *G02B 3/04* (2013.01); *B32B 7/023* (2019.01); *B32B 17/10* (2013.01); *C03C 27/10* (2013.01); *C08J 3/24* (2013.01); *C09J 5/00* (2013.01); *C08J 2333/08* (2013.01); *H04N 23/51* (2023.01)

(58) Field of Classification Search
CPC ....................................................... G02B 3/04
See application file for complete search history.

(56) References Cited

U.S. PATENT DOCUMENTS

2009/0208739 A1 8/2009 Husemann
2020/0325367 A1* 10/2020 Nakayama ............ C08F 279/02

FOREIGN PATENT DOCUMENTS

CN 101726815 A 6/2010
CN 110462458 A 11/2019
JP 2014152075 A 8/2014
(Continued)

OTHER PUBLICATIONS

Polyester Resin For Optical Applications, OKP, Osaka Gas Chemicals Co., Ltd, Aug. 2022; https://www.google.co.jp/urlsa=t&rct=j&q=&esrc=s&source=web&cd=&ved=2ahUKEwji3dD-6OuFAxV7mVYBHU1RCDkQFnoECBEQAQ&url=https%3A%2F%2Fwww.ogc.co.jp%2Fproducts%2Fpdf%2Fokp.pdf&usg=AOvVaw1KPf6S7ZkmZP5OpoqsNtQn&opi=89978449.
(Continued)

*Primary Examiner* — Daniel H Lee
(74) *Attorney, Agent, or Firm* — Canon U.S.A., Inc. I.P. Division

(57) ABSTRACT

A method of manufacturing an optical element includes preparing a first transparent base having a d-line refractive index of 1.80 or more and a second transparent base having a d-line refractive index of 1.80 or more, coating an adhesive on the first transparent base and/or the second transparent base, the adhesive containing a photo-curable resin and a photopolymerization initiator having an absorption edge wavelength of 410 nm or more, and bonding the first transparent base and the second transparent base by irradiating the adhesive with light with a wavelength of 400 nm or more through the second transparent base to cure the adhesive.

18 Claims, 5 Drawing Sheets

(51) Int. Cl.
*C09J 5/00* (2006.01)
*H04N 23/51* (2023.01)

(56) References Cited

FOREIGN PATENT DOCUMENTS

| | | | |
|---|---|---|---|
| JP | 2015108642 | A | 6/2015 |
| JP | 2016090748 | A | 5/2016 |
| JP | 2016120723 | A | 7/2016 |
| JP | 2018112687 | A | 7/2018 |
| JP | 2020024331 | A | 2/2020 |
| JP | 2020517764 | A | 6/2020 |
| WO | 2018180269 | A1 | 10/2018 |

OTHER PUBLICATIONS

Refractive Indices for Glass Type S-BSL 7, Ohara, Inc., Jan. 2024; https://www.ohara-inc.co.jp/assets/en/product/pdf/esbsl07.pdf.

* cited by examiner

OPTICAL ELEMENT MANUFACTURING METHOD, OPTICAL ELEMENT, OPTICAL APPARATUS, AND IMAGE CAPTURING APPARATUS

BACKGROUND OF THE INVENTION

Field of the Invention

The present disclosure relates to a method of manufacturing an optical element having a configuration in which two transparent bases with high refractive indexes are bonded to each other. The present disclosure also relates to an optical element manufactured by the manufacturing method, and an optical apparatus and an image capturing apparatus that incorporate the optical element.

Description of the Related Art

An optical system used for an image capturing apparatus, such as a camera, and an optical apparatus includes a plurality of optical elements, some optical elements of which are cemented lenses each formed by transparent bases such as glass materials being bonded to each other. In the optical system, the cemented lens functions to correct chromatic aberration that occurs in other lenses. Japanese Patent Application Laid-Open No. 2015-108642 discusses a method of manufacturing a cemented lens by bonding a convex lens and a concave lens with an ultraviolet curing adhesive.

However, if two lenses to be bonded to each other are glass (glass bases) with a high refractive index, insufficient ultraviolet light passes through one lens, which makes it difficult to fully cure the adhesive.

SUMMARY OF THE INVENTION

According to an aspect of the present disclosure, a method of manufacturing an optical element includes preparing a first transparent base having a d-line refractive index of 1.80 or more and a second transparent base having a d-line refractive index of 1.80 or more, coating an adhesive on the first transparent base and/or the second transparent base, the adhesive containing a photo-curable resin and a photopolymerization initiator having an absorption edge wavelength of 410 nm or more, and bonding the first transparent base and the second transparent base by irradiating the adhesive with light with a wavelength of 400 nm or more through the second transparent base to harden the adhesive.

According to another aspect of the present disclosure, an optical element includes a first transparent base having a d-line refractive index of 1.80 or more, a second transparent base having a d-line refractive index of 1.80 or more, and a bonding portion containing a hardened photo-curable resin bonding the first transparent base and the second transparent base. The bonding portion has an internal transmittance of more than or equal to 99%.

Further features of the present disclosure will become apparent from the following description of exemplary embodiments with reference to the attached drawings.

DESCRIPTION OF THE EMBODIMENTS

There is a known type of optical lens called a cemented lens formed of two transparent bases bonded to each other with an adhesive. Along with the recent increase in functionality of an image capturing apparatus, such as a camera, and an optical apparatus, there is demand for cemented lenses with high performance. For example, a high chromatic aberration correction effect is achievable by two glass bases with high refractive indexes of 1.80 or more bonded to each other.

Although the performance of a lens increases as the refractive index increases, the transmittance of ultraviolet light decreases. In particular, in most glass materials with high refractive indexes of 1.80 or more, the transmittance of ultraviolet light with wavelengths of 400 nm or less is low. In a certain wavelength range, many of the glass materials do not transmit the ultraviolet light. It therefore has been difficult to cure an ultraviolet curing adhesive between glass materials with high refractive indexes of 1.80 or more to a level at which the adhesive has a sufficient strength to bond the glass materials, due to an insufficient quantity of ultraviolet light reaching the adhesive.

The present inventors have found that an adhesive with a photopolymerization initiator with an absorption edge wavelength of 410 nm or more contained therein is cured to bond two transparent bases with high refractive indexes of 1.80 or more by light beams with wavelengths of 400 nm or more. In addition, the present inventors have found that the cured adhesive has a sufficient adhesive strength and forms its transparent bonding portion. Some exemplary embodiments of the present disclosure will be described below.

Figure 1:
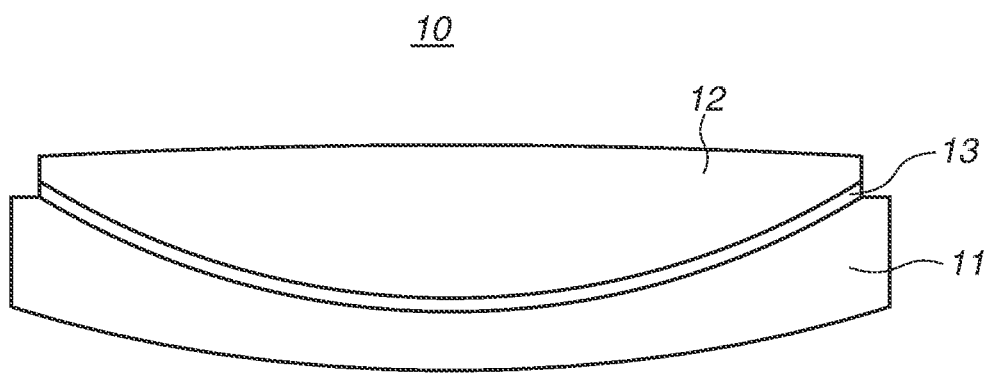
FIG. 1 is a schematic sectional view illustrating an optical element according to a first exemplary embodiment.

FIG. 1 is a schematic sectional view illustrating a first exemplary embodiment of an optical element manufactured by a manufacturing method according to the present exemplary embodiment.

An optical element 10 includes a first transparent base 11, a second transparent base 12, and a bonding portion 13. In other words, the optical element 10 is a type of optical element called a cemented lens formed of two transparent bases bonded to each other with an adhesive.

The first transparent base 11 and the second transparent base 12 each have a d-line refractive index of 1.80 or more. With the first transparent base 11 and the second transparent base 12 with d-line refractive indexes of 1.80 or more, a refractive index is designed according to a desired optical design, regardless of the size relationship between the first transparent base 11 and the second transparent base 12. The term "transparent" used herein means that the transmittance of light with a wavelength in the range from 400 nm to 780 nm is 10% or more.

The first transparent base 11 and the second transparent base 12 each have a high refractive index of 1.80 or more, allowing the optical element 10 according to the first exemplary embodiment to have a high functionality to correct chromatic aberration. In one or more embodiments, at least one of the first transparent base 11 or the second transparent base 12 has a refractive index 1.90 or more. In one or more embodiments, the first transparent base 11 and the second transparent base 12 each have a refractive index 1.90 or more.

The first transparent base 11 and the second transparent base 12 each have an extremely low transmittance of light with a wavelength of less than 400 nm, due to the transparent bases with a high refractive index of 1.80 or more. In particular, approximately 0% of the light with a wavelength of 360 nm passes through the first transparent base 11 and the second transparent base 12. In one or more embodiments, 30% or more of the light with wavelengths in the range from 400 nm to 780 nm passes through the first transparent base 11 and the second transparent base 12. This is because the time of curing the adhesive is shorter, in which the bonding portion 13 forms in a short period of time, as described in detail below.

The Abbe constants of the first transparent base 11 and the second transparent base 12 are in the range from 10 to 35. The optical element 10 with an Abbe constant in this range has a high refractive index of 1.80 or more, allowing the optical element 10 to be employed in a wide variety of optical systems. Abbe constant refers to an index representing the slope of a refractive index of the light with a wavelength in the range from 400 nm to 660 nm. Abbe constant is calculated by the following Expression (1).

$$\text{Abbe constant } vd=(nd-1)/(nf-nc) \quad (1)$$

nd: d-line (587.6 nm) refractive index
nf: f-line (486.1 nm) refractive index
nc: c-line (656.3 nm) refractive index Transparent resin and transparent glass are usable for the first transparent base 11 and the second transparent base 12. Glass is suitable for the first transparent base 11 and the second transparent base 12. Examples of glass materials used include typical optical glass such as silica glass, borosilicate glass, and phosphate glass, quartz glass, and glass ceramics. Examples of commercially available glass materials include FDS18-W (manufactured by HOYA Corporation) and S-LAH79, S-NPH3, and TAFD65 (the three manufactured by OHARA INC.). Circle shapes in plan view are suitable as the outer forms of the first transparent base 11 and the second transparent base 12. As illustrated in FIG. 1, the first transparent base 11 has a concave surface and the second transparent base 12 has a convex surface. The concave surface and the convex surface are bonded to each other via the bonding portion 13. In some embodiments, the first transparent base 11 has a convex surface and the second transparent base 12 has a concave surface. In other embodiments, the first transparent base 11 and the second transparent base 12 each have a flat surface, and the flat surfaces are bonded to each other.

The bonding portion 13 contains a cured product of a photo-curable resin and has an internal transmittance of 99% or more. The optical element 10 with the bonding portion 13 that has an internal transmittance of 99% or more, manufactured by the manufacturing method according to the present exemplary embodiment, is usable as a lens suitable for optical systems.

As for the thickness of the bonding portion 13, the range from 5 μm to 50 μm is suitable for the bonding portion 13 to have both sufficient adhesive strength and optical performance. The thickness of the bonding portion 13 described herein refers to the thickness of the bonding portion 13 in the normal direction to the surface of the first transparent base 11 opposite to the second transparent base 12, or in the normal direction to the surface of the second transparent base 12 opposite to the first transparent base 11. The bonding portion 13 with a thickness of less than 5 μm cannot tolerate a distortion caused by a difference in linear expansion coefficient between the first transparent base 11 and the second transparent base 12 as the temperature significantly fluctuates, which can lead to degradation in optical performance. On the other hand, the bonding portion 13 with a thickness of more than 50 μm can have an insufficient adhesive strength. It is suitable that the difference between the values maximum and minimum of the thickness of the bonding portion 13 is less than or equal to 10 μm. This range reduces the variation in optical performance due to a difference in elasticity modulus in the bonding portion 13. In one or more embodiments, the difference between the values maximum and minimum of the thickness of the bonding portion 13 is less than or equal to 5 μm.

It is suitable that the elasticity modulus of the bonding portion 13 is in the range from 0.1 GPa to 1.0 GPa. The bonding portion 13 with an elasticity modulus of less than 0.1 GP can cause the center of the first transparent base 11 to be misaligned with the center of the second transparent base 12, impairing the optical performance. On the other hand, the bonding portion 13 with an elasticity modulus of more than 1.0 GPa can be weak, reducing the mechanical strength of the optical element 10.

(Modified Example of Optical Element)

Figure 2:
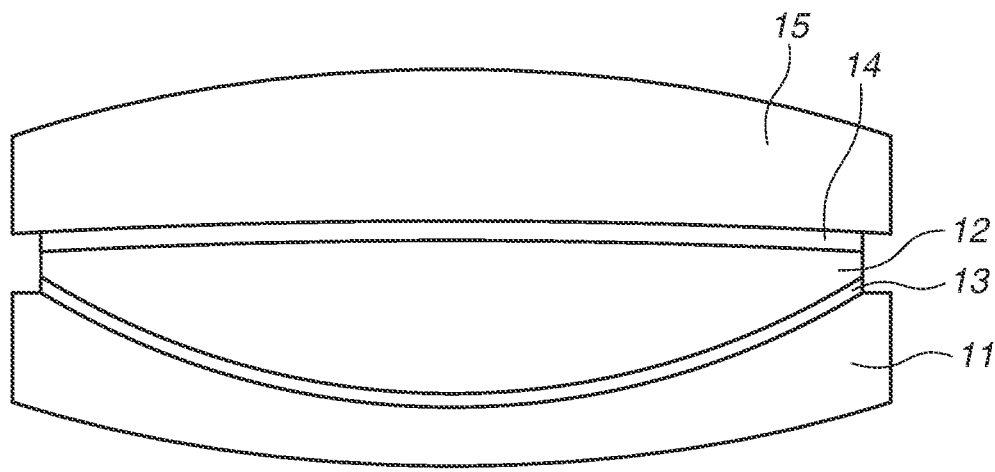
FIG. 2 is a schematic sectional view illustrating an optical element according to a modified example.

FIG. 2 is a schematic sectional view illustrating an optical element according to a modified example.

An optical element 10B illustrated in FIG. 2 includes a third transparent base 15 and a second bonding portion 14, in addition to the first transparent base 11, the second transparent base 12, and the bonding portion 13. The optical element 10B is a cemented lens formed of three transparent bases bonded to one another with an adhesive. As with the first transparent base 11 and the second transparent base 12, the third transparent base 15 has a d-line refractive index of 1.80 or more. In one or more embodiments, the third transparent base 13 has a refractive index of more than or equal to 1.90. As with the bonding portion 13, the second bonding portion 14 contains a cured product of a photo-curable resin and has an internal transmittance of 99% or more. The optical element 10B with the bonding portion 13 and the second bonding portion 14 that each have an inner transmittance of more than or equal to 99% is usable as a lens suitable for optical systems.

(Method of Manufacturing Optical Element)

Next, a method of manufacturing the optical element 10 according to the first exemplary embodiment will be described with reference to FIG. 3A to 3E.

First, the first transparent base 11 and the second transparent base 12 are prepared. It is suitable that the surface of the first transparent base facing the second transparent base 12 is subjected to pre-treatment to improve the adhesiveness between the first transparent base 11 and the bonding portion 13. It is also suitable that the surface of the second transparent base facing the first transparent base 11 is subjected to pre-treatment to improve the adhesiveness between the second transparent substrate 12 and the bonding portion 13. An ozone treatment is suitable for the two pre-treatments. An ozone treatment gets the adhesive wet, which facilitates the distribution of the adhesive. In some embodiments, a coupling treatment using a silane coupling agent is performed. Specific examples of the coupling agent include hexamethyldisilazane, methyltrimethoxysilane, trimethylchlorosilane, and triethylchlorosilane.

Figure 3A:
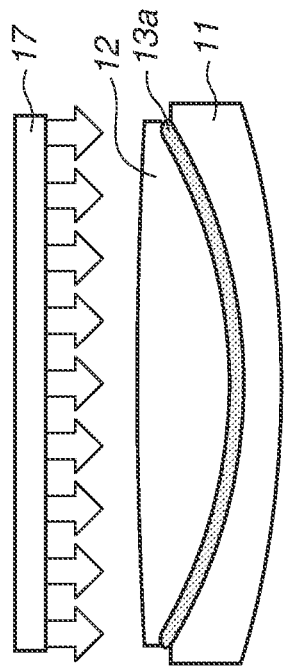
FIGS. 3A to 3E are schematic views each illustrating a method of manufacturing the optical element according to the first exemplary embodiment.

Next, as illustrated in FIG. 3A, an uncured adhesive 13a, which is a precursor of the bonding portion 13, is coated on the surface of the first transparent base 11 on which the bonding portion 13 is to be formed. The method of coating the adhesive 13a is not limited. For example, a dispenser is usable. The adhesive 13a contains a photo-curable resin and a photopolymerization initiator. The type of photo-curable resin is not limited. Resin is used that becomes transparent through the curing of the resin. Examples of the resin include acrylic resin, urethane acrylic resin, silicone acrylic resin, and epoxy resin. The photopolymerization initiator functions to absorb light to generate radicals, and polymerize monomers or oligomers of photo-curable resin by the radicals. The photopolymerization initiator according to the present exemplary embodiment has an absorption edge wavelength of 410 nm or more, and sufficiently absorbs the visible light with a wavelength of 400 nm or more. The adhesive 13a used in the present exemplary embodiment is curable by the light with a wavelength of 400 nm or more. In one or more embodiments, the absorption edge wavelength is more than or equal to 420 nm.

Figure 4:
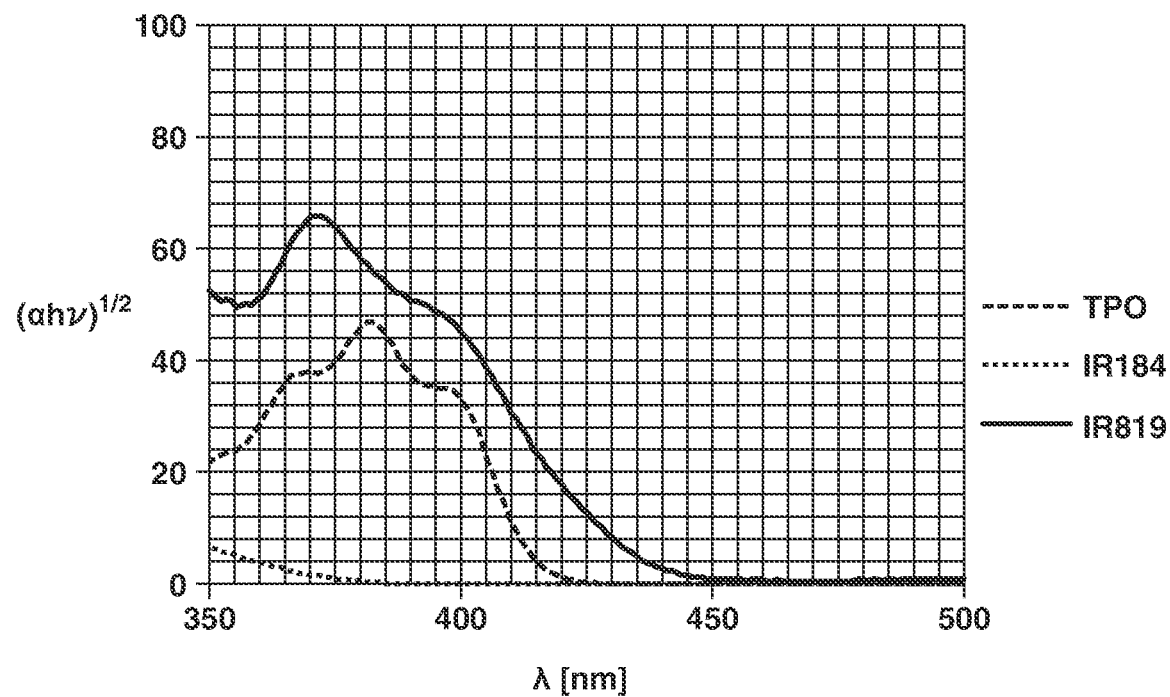
FIG. 4 is a schematic graph illustrating a wavelength dependence of $(\alpha h\nu)^{1/2}$ of photopolymerization initiator for use in the method of manufacturing the optical element according to the first exemplary embodiment.

Specifically, it is suitable that the photopolymerization initiator is at least one of IRGACURE® 819 (bis(2,4,6-trimethylbenzoyl)phenylphosphine oxide)) or IRGACURE® TPO (diphenyl(2,4,6-trimethylbenzoyl)phosphine oxide)). FIG. 4 is a schematic graph illustrating absorption spectrums of photopolymerization initiators. In FIG. 4, the solid line represents IRGACURE® 819 (IR819), and a dashed line represents IRGACURE® TPO (TPO). The horizontal axis represents a wavelength $\Delta$ and a vertical axis represents $\alpha h\nu^{1/2}$, where a represents an absorption coefficient ($cm^{-1}$), h represents a Planck constant (J·s), and v represents the frequency (Hz) of a photon. The absorption edge wavelength is generally defined by an x-intercept extrapolated to the x-axis where photon energies hv are plotted in a graph with the y-axis where $\alpha h\nu^{1/2}$ values are plotted. In FIG. 4, the horizontal axis, which does not represent photon energies hv but represents converted wavelengths, shows that the absorption edge wavelength of IRGACURE® 819 is 455 nm and the absorption edge wavelength of IRGACURE® TPO is 425 nm. A maximum absorption wavelength of less than 410 nm is sufficient. It is suitable that the photopolymerization initiator content in the adhesive 13a is in the range from 0.5 mass % to 5.0 mass %.

These photopolymerization initiators are phosphorus materials that absorb light with a wavelength of 400 nm or more and contains a salt containing phosphorus. Phosphorus materials are beneficial in no toxicity unlike antimony-based materials containing antimony-containing salt. To determine whether the cured bonding portion 13 contains phosphorus, a known technique such as wavelength dispersed X-ray analysis, energy dispersed X-ray analysis, inductivity coupled plasma (ICP) emission analysis, or ICP mass analysis is usable. It is suitable that this measurement is performed by using a known technique such as a gas chromatograph mass analysis (GC-MS) and by estimating types and contents of photo-curable resin and photopolymerization initiator with reference to various data sheets.

In one or more embodiments, IRGACURE® 184 (1-Hydroxycyclohexyl)phenyl ketone) is contained as a photopolymerization initiator, in addition to IRGACURE® 819 or IRGACURE® TPO. In the spectrum illustrated in FIG. 4, the dashed line represents IRGACURE® 184 (IR814). As illustrated in FIG. 4, the absorption edge wavelength of IRGACURE® 184 is 380 nm, which means that IRGACURE® 184 does not absorb the light with a wavelength of 400 nm or more, but IRGACURE® 184 functions to polymerize monomers or oligomers of the photo-curable resin after IRGACURE® 819 or IRGACURE® TPO generates radicals. IRGACURE® 184 is colorless, which is excellent in transparency. This allows the internal transmittance of the bonding portion 13 formed by the adhesive containing IRGACURE® 184 being cured to be increased. It is suitable that the content of IRGACURE® 184 is in the range from 50 mass % to 250 mass % with respect to IRGACURE® 819 or IRGACURE® TPO.

Figure 3B:
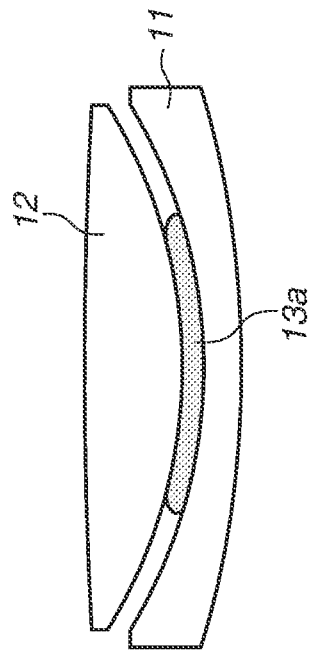
Figure 3C:
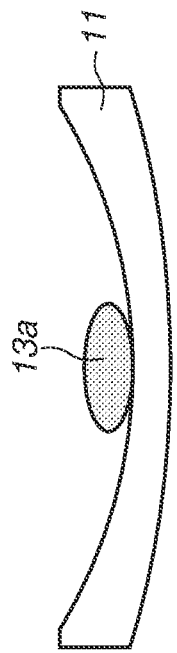

Next, the second transparent base 12 is positioned to first transparent base 11 while the center of the second transparent base 12 coincides with the center of the first transparent base 11, with a jig (not illustrated). Then, as illustrated in FIGS. 3B and 3C, the second transparent base 12 is made closer to the first transparent base 11, thereby filling the adhesive 13a in the radial direction. The second transparent base 12 is made closer to the first transparent base 11 to a level at which the adhesive 13a has a desired thickness.

Figure 3D:
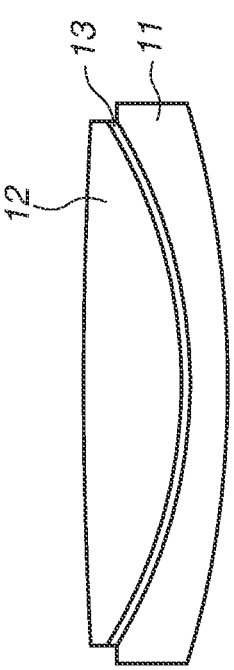

Next, as illustrated in FIG. 3D, the adhesive 13a is irradiated with light with a wavelength of 400 nm or more from a light source 17 through the second transparent base 12, thereby starting a curing reaction of the adhesive 13a. While the second transparent base 12 has a high refractive index of 1.80 or more, the transmittance of the second transparent base 12 with respect to the light with a wavelength of 400 nm or more is more than or equal to 10%. This relationship allows the light to reach the adhesive 13a through the second transparent base 12. In addition, the adhesive 13a may be irradiated with light with a wavelength of 400 nm or more from the light source 17 through the first transparent base 11. The light source 17 is, for example, light-emitting diodes (LED).

Figure 3E:

Irradiation of the adhesive 13a with light with a wavelength of 400 nm or more for a certain period of time causes the bonding portion 13 with an internal transmittance of 99% or more to be formed as illustrated in FIG. 3E. As a result, the optical element 10 is obtained. It is suitable that the bonding portion 13 contains an unreacted photopolymerization initiator. If the first transparent base 11 and the second transparent base 12 each have a curved surface, between which the bonding portion 13 is to be formed, the bonding portion 13 has many internal stresses left with the reaction of all the photopolymerization initiators complete. The remaining internal stresses can deform an optical surface of the optical element 10 after the optical element 10 is returned from a high-temperature and high-humidity environment to a room temperature environment. It is suitable that the content of an unreacted photopolymerization initiator is less than or equal to 10 mass % with respect to the photopolymerization initiator contained in the adhesive 13a. As described above, it is suitable that the content of the photopolymerization initiators contained in the adhesive 13a is in the range from 0.5 mass % to 5.0 mass %. It is suitable that 0.05 mass % to 0.5 mass % of the unreacted photopolymerization initiator is contained in the bonding portion 13, accordingly.

In the exemplary embodiment described above, the adhesive 13a is coated on the first transparent base 11, but instead may be coated on the second transparent base 12. Alternatively, the adhesive 13a may be coated on both the first transparent base 11 and the second transparent base 12.

(Optical Apparatus)

A second exemplary embodiment will be described. In the second exemplary embodiment, a specific application example will be described of the optical element according to the first exemplary embodiment. Specific application examples of the optical element include a lens constituting an optical apparatus for cameras or video camcorders (image capturing optical systems), and a lens constituting an optical apparatus for liquid crystal projectors (projection optical systems). The optical element is also usable as a pickup lens of a digital versatile disc (DVD) recorder or other devices. These optical systems include a plurality of lenses disposed in a housing, and the optical element according to the first exemplary embodiment is usable as at least one of the lenses.

(Image Capturing Apparatus)

Figure 5:
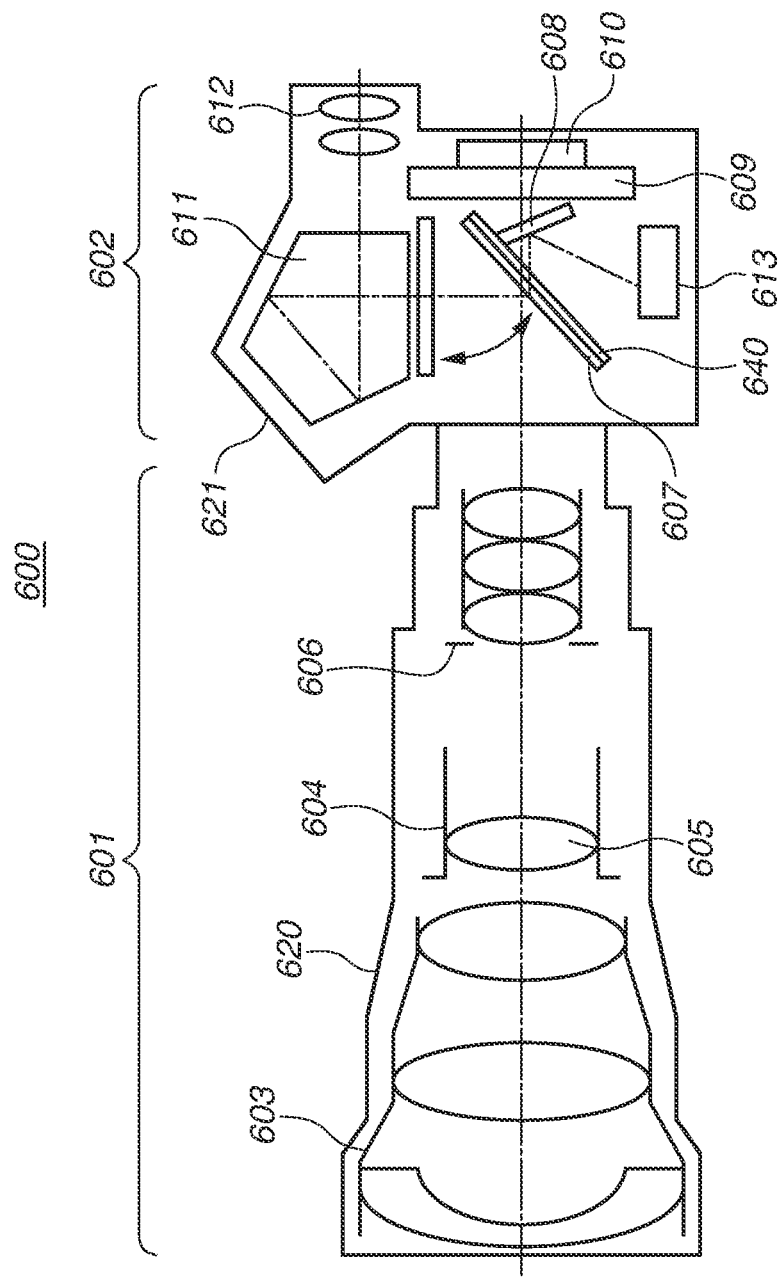
FIG. 5 is a schematic view illustrating an image capturing apparatus according to a second exemplary embodiment.

FIG. 5 illustrates a configuration of a digital single-lens reflex camera 600 as an example of an exemplary embodiment of an image capturing apparatus including the optical element according to the first exemplary embodiment. As illustrated in FIG. 5, a lens barrel 601 as an optical apparatus, a so-called interchangeable lens, is detachably coupled to a camera body 602.

Light from an object is captured in an image through an optical system including a plurality of lenses 603 and 605 disposed along the optical axis of an image capturing optical system in a housing 620 of the lens barrel 601. The optical element according to the first exemplary embodiment is usable as, for example, the lenses 603 and 605. In the optical element according to the first exemplary embodiment, two transparent bases that each have a high refractive index are bonded to each other. The two transparent bases thus have a refractive power more than a conventional optical element, allowing the length of the optical system to be shortened compared with the length of a conventional optical system. As a result, the weight of the lens barrel 601 is reduced. In this case, the lens 605 is supported by an internal barrel 604 movably with reference to the outer barrel of the lens barrel 601 for focusing or zooming.

In an observation period before image capturing, light from the object is reflected by a main mirror 607 in the housing 621 of the camera body 602 and is transmitted through a prism 611 and a finder lens 612 to a user in a captured image. The main mirror 607 is, for example, a half mirror. Light that has passed through the main mirror 607 is reflected by a sub-mirror 608 to an autofocus (AF) unit 613. This reflected light is used in, for example, ranging. The main mirror 607 is mounted and supported by a main mirror holder 640, for example, by bonding. The main mirror 607 and the sub-mirror 608 are moved outside of the optical path during an image capturing by a drive mechanism (not illustrated), releasing a shutter 609. Under this condition, an image sensor 610 receives light that has entered the lens barrel 601 and passed through the image capturing system, forming a captured optical image. A diaphragm 606 is configured to change its aperture area to adjust brightness or focal length in image capturing.

In the present exemplary embodiment, a digital single-lens reflex camera is described as an example of the image capturing apparatus. However, the optical element according to the first exemplary embodiment is usable in smartphones, compact digital cameras, and other devices.

EXAMPLES

The present disclosure will be described in more detail with reference to examples and comparative examples. First, how to evaluate examples and comparative examples will be described.

(Adhesive Strength)

A manufactured optical element was put in a constant temperature chamber set to 60° C. and 70% humidity, and was taken out of the constant temperature chamber in 2,000 hours. The bonding portion of the optical element taken out of the constant temperature chamber was visually checked and also observed through an optical microscope. The optical element with no peeling observed was evaluated as "A" and the optical element with any peeling observed was evaluated as "C".

(Internal Transmittance of Bonding Portion)

Two types of transmittance measurement sample were prepared and evaluated for the internal transmittance of the bonding portion. Two transparent bases each having a thickness of 1 mm were prepared and an adhesive was filled between the two transparent bases so that a thickness d1 of the bonding portion became 10 μm after the adhesive was cured. The filled adhesive in examples and comparative examples was irradiated with light with the same wavelength and a light intensity of 10 mW/cm², through which a first sample was obtained. A second sample was obtained with a thickness d2 between two transparent bases of 50 μm after the adhesive was cured through the same procedure as that for the first sample, except that the amount of adhesive was increased. The transmittances of the first sample and the second sample were measured with a spectrophotometer (U-4000 manufactured by Hitachi, Ltd.). Where the transmittance of the first sample is represented by T1 and the transmittance of the second sample is represented by T2, using the following expression based on the parameters, an internal transmittance τ of the bonding portion with a thickness d (=10 μm) is obtained. Also, for an optical element of a finished product, the transmittance τ is measurable by a method similar to the method using transmittance samples by identifying the position with a thickness of 10 μm and the position with a thickness of 50 μm.

$$\log \tau = -\frac{(\log T1 - \log T2)}{(d2 - d1)} \times d \qquad \text{Expression (1)}$$

(Profile Irregularity)

The manufactured optical elements were placed in a high-temperature oven. Profile irregularity was evaluated through comparison of the shape of each optical element before measurement with the shape of the optical element after measurement. Specifically, first, the surface shape of each optical element was measured in the environment at a temperature of 20° C.±5° C. with a Verifire laser interferometer system (manufactured by ZYGO Corporation). After that, the optical element was put into the oven and it took five hours to increase the temperature in the oven from 20° C. to 70° C. In the oven, the temperature was held at 70° C. for 24 hours, and then it took five hours to decrease the temperature from 70° C. to 20° C. After it was confirmed that the temperature of the optical element decreased to 25° C. or lower one hour after the cooling process, the surface shape was measured in the environment at a temperature of 20° C.±5° C. The first transparent base and the second transparent base each had an area corresponding to 90% of its lens diameter subjected to R-shape fitting, and the result of change in the surface shape before the optical element was put in the oven and after the optical element was taken out of the oven was evaluated using interference fringe. If the change in one or less interference fringe was observed, the evaluation result was "A". If the change in two or less interference fringes was observed, the evaluation result was "B". If the change in more than two interference fringes was observed, the evaluation result was "C".

Next, transparent bases and photopolymerization initiators used in examples and comparative examples are listed below.

(Transparent Base)

(S-1) FDS18-W manufactured by HOYA Corporation, refractive index $n_d$=1.945, Abbe constant $v_d$=17.98, plano-convex lens, diameter φ=30 mm, curvature radius R=+30 mm, central thickness t=15 mm, and the transmittance of light with a wavelength in the range from 400 nm to 780 nm is 36% or more (S-2) S-NPH3 manufactured by OHARA INC., refractive index $n_d$=1.959, Abbe constant $v_d$=17.47, plano-concave lens, diameter φ=30 mm, curvature radius R=−30 mm, central thickness t=5 mm, and the transmittance of light with a wavelength in the range from 400 nm to 780 nm is 12% or more (S-3) S-LAH79 manufactured by OHARA INC., refractive index $n_d$=2.003, Abbe constant $v_d$=28.27, plano-concave lens, diameter φ=30 mm, curvature radius R=−30 mm, central thickness t=5 mm, and the transmittance of light with a wavelength in the range from 400 nm to 780 nm is 50% or more (S-4) TAFD65 manufactured by OHARA INC., refractive index $n_d$=2.050, Abbe constant $v_d$=26.94, plano-concave lens, diameter φ=30 mm, curvature radius R=−30 mm, central thickness t=5 mm, and the transmittance of light with a wavelength in the range from 400 nm to 780 nm is 60.9% or more (S-5) S-NPH1 manufactured by OHARA INC., refractive index $n_d$=1.808, Abbe constant $v_d$=22.80, plano-concave lens, diameter φ=30 mm, curvature radius R=−30 mm, central thickness t=5 mm, and the transmittance of light with a wavelength in the range from 400 nm to 780 nm is 77% or more (Photopolymerization Initiator)

(I-1) acylphosphine oxide-based photopolymerization initiator IRGACURE® 819, IGM Resins B.V.

(I-2) acylphosphine oxide-based photopolymerization initiator IRGACURE® TPO, IGM Resins B.V.

(I-3) alkylphenone-based photopolymerization initiator IRGACURE® 184, IGM Resins B.V.

Example 1

In Example 1, an optical element having the shape illustrated in FIG. 1 was prepared by the manufacturing method illustrated in FIGS. 3A to 3E.

A FDS18-W (S-1) manufactured by HOYA Corporation was used as the first transparent base 11. An S-LAH79 (S-3) manufactured by OHARA INC. was used as the second transparent base 12. First, as illustrated in FIG. 3A, acrylic ultraviolet (UV) curing resin was dropped as the uncured adhesive 13a onto the first transparent base 11. The adhesive 13a contained 2 mass % of IRGACURE® 819 (I-1) as a photopolymerization initiator.

Next, as illustrated in FIGS. 3B and 3C, the first transparent base 11 and the second transparent base 12 were pushed closer to each other, distributing the adhesive 13a to be filled in the gap between the first transparent base 11 and the second transparent base 12.

Then, as illustrated in FIG. 3D, the entire adhesive 13a was irradiated with light with a wavelength of 405 nm through the second transparent base 12, curing to bond the first transparent base 11 and the second transparent base 12. The light source 17 used was a high-pressure mercury lamp (EXECURE250, HOYA CANDEO OPTRONICS Corporation). The light was emitted under two light emitting conditions: 2J and 20J. The optical element according to Example 1 was manufactured through the processes described above. The thickness of the bonding portion was in the range from 10 μm to 20 μm.

Example 2

An optical element according to Example 2 was manufactured in the same procedure as that for Example 1, except that a TAFD65 (S-4) manufactured by OHARA INC. was used as the second transparent base 12.

Example 3

An optical element according to Example 3 was manufactured in the same procedure as that for Example 1, except that an S-NPH3 (S-2) manufactured by OHARA INC. was used as the second transparent base 12.

Example 4

An optical element according to Example 4 was manufactured in the same procedure as that for Example 1, except that 3 mass % of IRGACURE® TPO (I-2) was contained instead of IRGACURE® 819 as the photopolymerization initiator.

Example 5

An optical element according to Example 5 was manufactured in the same procedure as that for Example 4, except that a TAFD65 (S-4) manufactured by OHARA INC. was used as the second transparent base 12.

Example 6

An optical element according to Example 6 was manufactured in the same procedure as that for Example 4, except that an S-NPH3 (S-2) manufactured by OHARA INC. was used as the second transparent base 12.

Example 7

An optical element according to Example 7 was manufactured in the same procedure as that for Example 1, except that 1.5 mass % of IRGACURE® 819 (I-1) and 2 mass % of IRGACURE® 184 (I-3) were contained as photopolymerization initiators.

Example 8

An optical element according to Example 8 was manufactured in the same procedure as that for Example 7, except that a TAFD65 (S-4) manufactured by OHARA INC. was used as the second transparent base 12.

Example 9

An optical element according to Example 9 was manufactured in the same procedure as that for Example 7, except that an S-NPH3 (S-2) manufactured by OHARA INC. was used as the second transparent base 12.

Example 10

An optical element according to Example 10 was manufactured in the same procedure as that for Example 1, except that 2 mass % of IRGACURE® TPO (I-2) and 2 mass % of IRGACURE® 184 (I-3) were contained as photopolymerization initiators.

Example 11

An optical element according to Example 11 was manufactured in the same procedure as that for Example 10, except that a TAFD65 (S-4) manufactured by OHARA INC. was used as the second transparent base 12.

Example 12

An optical element according to Example 12 was manufactured in the same procedure as that for Example 10, except that an S-NPH3 (S-2) manufactured by OHARA INC. was used as the second transparent base 12.

Example 13

An optical element according to Example 13 was manufactured in the same procedure as that for Example 1, except that 2 mass % of IRGACURE® 819 (I-1) and 2 mass % of IRGACURE® TPO (I-2) were contained as photopolymerization initiators.

Example 14

An optical element according to Example 14 was manufactured in the same procedure as that for Example 13, except that a TAFD65 (S-4) manufactured by OHARA INC. was used as the second transparent base 12.

Example 15

An optical element according to Example 15 was manufactured in the same procedure as that for Example 13, except that an S-NPH3 (S-2) manufactured by OHARA INC. was used as the second transparent base 12.

Example 16

An optical element according to Example 16 was manufactured in the same procedure as that for Example 13, except that an S-NPH1 (S-5) manufactured by OHARA INC. was used as the second transparent base 12.

Comparative Example 1

Comparative Example 1 differs from Example 1 in regard to light emitting conditions. Specifically, the wavelength of light emitted to the entire adhesive 13*a* through the second transparent base 12 was 365 nm. An optical element according to Comparative Example 1 was manufactured in the same procedure as that for Example 1, except for the light emitting condition.

Comparative Example 2

An optical element according to Comparative Example 2 was manufactured in the same procedure as that for Comparative Example 1, except that a TAFD65 (S-4) manufactured by OHARA INC. was used as the second transparent base 12.

Comparative Example 3

An optical element according to Comparative Example 3 was manufactured in the same procedure as that for Comparative Example 1, except that an S-NPH3 (S-2) manufactured by OHARA INC. was used as the second transparent base 12.

Comparative Example 4

Comparative Example 1 differs from Example 1 in regard to the type of photopolymerization initiator. Specifically, instead of IRGACURE® 819, 3 mass % of IRGACURE® 184 (I-3) was contained in the adhesive as a photopolymerization initiator. An optical element according to Comparative Example 4 was manufactured in the same procedure as that for Example 1, except for the type of photopolymerization initiator.

Comparative Example 5

An optical element according to Comparative Example 5 was manufactured in the same procedure as that for Comparative Example 4, except that a TAFD65 (S-4) manufactured by OHARA INC. was used as the second transparent base 12.

Comparative Example 6

An optical element according to Comparative Example 6 was manufactured in the same procedure as that for Comparative Example 4, except that an S-NPH3 (S-2) manufactured by OHARA INC. was used as the second transparent base 12.

Table 1 illustrates the conditions for manufacturing Examples 1 to 16 and Comparative Examples 1 to 6 described above.

TABLE 1

| | First transparent base | Second transparent base | Initiator Type | Initiator Content (mass %) | Emitting Condition Wavelength (nm) |
|---|---|---|---|---|---|
| Example 1 | S-1 | S-3 | I-1 | 2 | 405 |
| Example 2 | S-1 | S-4 | I-1 | 2 | 405 |
| Example 3 | S-1 | S-2 | I-1 | 2 | 405 |
| Example 4 | S-1 | S-3 | I-2 | 3 | 405 |
| Example 5 | S-1 | S-4 | I-2 | 3 | 405 |
| Example 6 | S-1 | S-2 | I-2 | 3 | 405 |
| Example 7 | S-1 | S-3 | I-1/I-3 | 1.5/2 | 405 |
| Example 8 | S-1 | S-4 | I-1/I-3 | 1.5/2 | 405 |
| Example 9 | S-1 | S-2 | I-1/I-3 | 1.5/2 | 405 |
| Example 10 | S-1 | S-3 | I-2/I-3 | 2/2 | 405 |
| Example 11 | S-1 | S-4 | I-2/I-3 | 2/2 | 405 |
| Example 12 | S-1 | S-2 | I-2/I-3 | 2/2 | 405 |
| Example 13 | S-1 | S-3 | I-1/I-2 | 2/2 | 405 |
| Example 14 | S-1 | S-4 | I-1/I-2 | 2/2 | 405 |
| Example 15 | S-1 | S-2 | I-1/I-2 | 2/2 | 405 |
| Example 16 | S-1 | S-5 | I-1/I-2 | 2/2 | 405 |
| Comparative Example 1 | S-1 | S-3 | I-1 | 2 | 365 |
| Comparative Example 2 | S-1 | S-4 | I-1 | 2 | 365 |
| Comparative Example 3 | S-1 | S-2 | I-1 | 2 | 365 |
| Comparative Example 4 | S-1 | S-3 | I-3 | 4 | 405 |
| Comparative Example 5 | S-1 | S-4 | I-3 | 4 | 405 |
| Comparative Example 6 | S-1 | S-2 | I-3 | 4 | 405 |

Next, the adhesive strength and the internal transmittance and profile irregularity of the bonding portion were evaluated by the method described above for the optical elements according to Examples 1 to 16 and Comparative Examples 1 to 6. The evaluation results are listed in Table 2.

TABLE 2

| | Adhesive strength | Internal transmittance (%) | | Profile irregularity | |
|---|---|---|---|---|---|
| | | 2J | 20J | 2J | 20J |
| Example 1 | A | 99 | 99.5 | A | A |
| Example 2 | A | 99 | 99.5 | A | A |
| Example 3 | A | 99 | 99.5 | B | A |
| Example 4 | A | 99.5 | 99.7 | A | A |
| Example 5 | A | 99.5 | 99.7 | A | A |
| Example 6 | A | 99.5 | 99.7 | B | A |
| Example 7 | A | 99.5 | 99.7 | A | A |
| Example 8 | A | 99.5 | 99.7 | A | A |
| Example 9 | A | 99.5 | 99.7 | B | A |
| Example 10 | A | 99.6 | 99.8 | A | A |
| Example 11 | A | 99.6 | 99.8 | A | A |
| Example 12 | A | 99.6 | 99.8 | B | A |
| Example 13 | A | 99.5 | 99.7 | A | A |
| Example 14 | A | 99.5 | 99.7 | A | A |
| Example 15 | A | 99.5 | 99.7 | B | A |
| Example 16 | A | 99.5 | 99.7 | A | A |
| Comparative Example 1 | C | — | — | — | — |
| Comparative Example 2 | C | — | — | — | — |
| Comparative Example 3 | C | — | — | — | — |
| Comparative Example 4 | C | — | — | — | — |
| Comparative Example 5 | C | — | — | — | — |
| Comparative Example 6 | C | — | — | — | — |

In Comparative Examples 1 to 6, peeling was observed in the evaluation of the adhesive strength, resulting in "C", insufficient adhesive strength.

In Comparative Examples 1 to 3, emitted light with a wavelength of 365 nm passed through the second transparent base 12 insufficiently, causing the most part of the adhesive not to be cured, resulting in the occurrence of peeling. For this reason, the internal transmittance and profile irregularity were not evaluated for Comparative Examples 1 to 3.

The light with a wavelength of 405 nm emitted to Comparative Examples 4 to 6 had an adsorption edge wavelength of the photopolymerization initiator contained in the adhesive of less than 410 nm. This caused the occurrence of peeling as the most part of the adhesive was not cured. For this reason, the internal transmittance and profile irregularity were not evaluated for Comparative Examples 4 to 6.

On the other hand, no peeling was observed in the evaluation of the adhesive strength for Examples 1 to 16, resulting in "A", excellent adhesive strength. Examples 1 to 16 each had a bonding portion with an internal transmittance more than or equal to 99%, an excellent internal transmittance. Under the light emitting condition of 20J, the profile irregularity was evaluated excellent for Examples 1 to 16.

Under the emitting condition of 2J, the profile irregularity was evaluated "B" for Examples 3, 6, 9, and 12, each of which used an S-NPH3 (S-2) manufactured by OHARA INC. as the second transparent base 12. It is possible as a cause that the second transparent base had a low transmittance of light with a wavelength of 405 nm as compared with the other examples.

In comparison of the examples for internal transmittance, the examples using two types of photopolymerization initiators tend to have a higher transmittance than the examples using either IRGACURE® 819 or IRGACURE® TPO as a photopolymerization initiator have. In particular, Examples 10 to 12, in which IRGACURE® TPO and IRGACURE® 184 were used in combination, showed the highest transmittance.

According to the exemplary embodiments of the present disclosure, an optical element is provided which is formed by two transparent bases each having a d-line high refractive index of 1.80 or more being bonded to each other with a sufficient adhesive strength.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-114044, filed Jul. 1, 2020, which is hereby incorporated by reference herein in its entirety.

What is claimed is:

1. A method of manufacturing an optical element, comprising:
   preparing a first transparent base having a d-line refractive index of 1.80 or more and a second transparent base having a d-line refractive index of 1.80 or more;
   coating an adhesive on the first transparent base and/or the second transparent base, the adhesive containing a photo-curable resin and a photopolymerization initiator having an absorption edge wavelength of 410 nm or more; and
   bonding the first transparent base and the second transparent base by irradiating the adhesive with light with a wavelength of 400 nm or more through the second transparent base to cure the adhesive.

2. The method of manufacturing the optical element according to claim 1, wherein the d-line refractive index of the second transparent base is more than or equal to 1.90.

3. The method of manufacturing the optical element according to claim 1, wherein a content of the photopolymerization initiator contained in the adhesive is in a range from 0.5 mass % to 5.0 mass %.

4. The method of manufacturing the optical element according to claim 1, wherein the photopolymerization initiator comprises at least one of IRGACURE 819 (bis(2,4,6-trimethylbenzoyl)phenylphosphine oxide) or IRGACURE TPO (diphenyl(2,4,6-trimethylbenzoyl)phosphine oxide).

5. The method of manufacturing the optical element according to claim 4, wherein the photopolymerization initiator further comprises IRGACURE 184 (1-Hydroxycyclohexyl)phenyl ketone).

6. The method of manufacturing the optical element according to claim 5, wherein a content of the IRGACURE 184 (1-Hydroxycyclohexyl)phenyl ketone) is in a range from 50 mass % to 250 mass % with respect to either the IRGACURE 819 (bis(2,4,6-trimethylbenzoyl)phenylphosphine oxide) or the IRGACURE TPO (diphenyl(2,4,6-trimethylbenzoyl)phosphine oxide).

7. The method of manufacturing the optical element according to claim 5, wherein the first transparent base and the second transparent base are selected from the group consisting of transparent resin and transparent glass.

8. The method of manufacturing the optical element according to claim 7, wherein the first transparent base and the second transparent base are selected from the group consisting of silica glass, borosilicate glass, and phosphate glass, quartz glass, and glass ceramics.

9. The method of manufacturing the optical element according to claim 8, wherein the wavelength of the light with which the adhesive is irradiated is more than 400 nm.

10. The method of manufacturing the optical element according to claim 7, wherein the wavelength of the light with which the adhesive is irradiated is more than 400 nm.

11. The method of manufacturing the optical element according to claim 1, wherein the photopolymerization initiator comprises IRGACURE TPO (diphenyl(2,4,6-trimethylbenzoyl)phosphine oxide).

12. The method of manufacturing the optical element according to claim 11, wherein the photopolymerization initiator further comprises at least one of IRGACURE 819 bis((2,4,6-trimethylbenzoyl)phenylphosphine oxide) and IRGACURE 184 (1-Hydroxycyclohexyl)phenyl ketone).

13. The method of manufacturing the optical element according to claim 12, wherein the first transparent base and the second transparent base are selected from the group consisting of transparent resin and transparent glass.

14. The method of manufacturing the optical element according to claim 13, wherein the first transparent base and the second transparent base are selected from the group consisting of silica glass, borosilicate glass, and phosphate glass, quartz glass, and glass ceramics.

15. The method of manufacturing the optical element according to claim 14, wherein the wavelength of the light with which the adhesive is irradiated is more than 400 nm.

16. The method of manufacturing the optical element according to claim 13, wherein the wavelength of the light with which the adhesive is irradiated is more than 400 nm.

17. The method of manufacturing the optical element according to claim 1, wherein the adhesive has an internal transmittance of 99% or more.

18. The method of manufacturing the optical element according to claim 1, wherein an Abbe constant of the first transparent base is in a range from 10 to 35, and an Abbe constant of the second transparent base is in a range from 10 to 35.

\* \* \* \* \*